United States Patent Office 3,452,541
Patented July 1, 1969

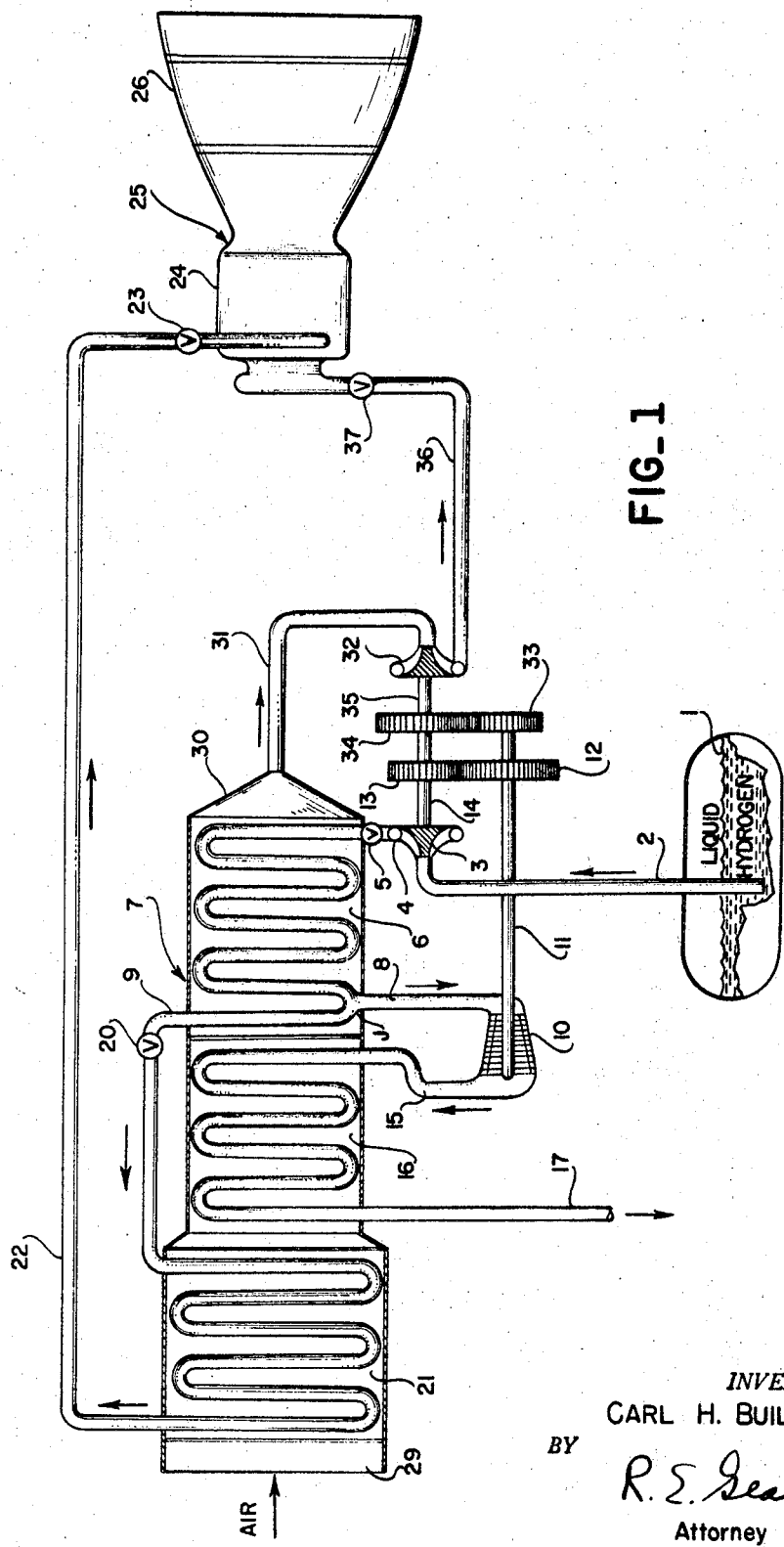

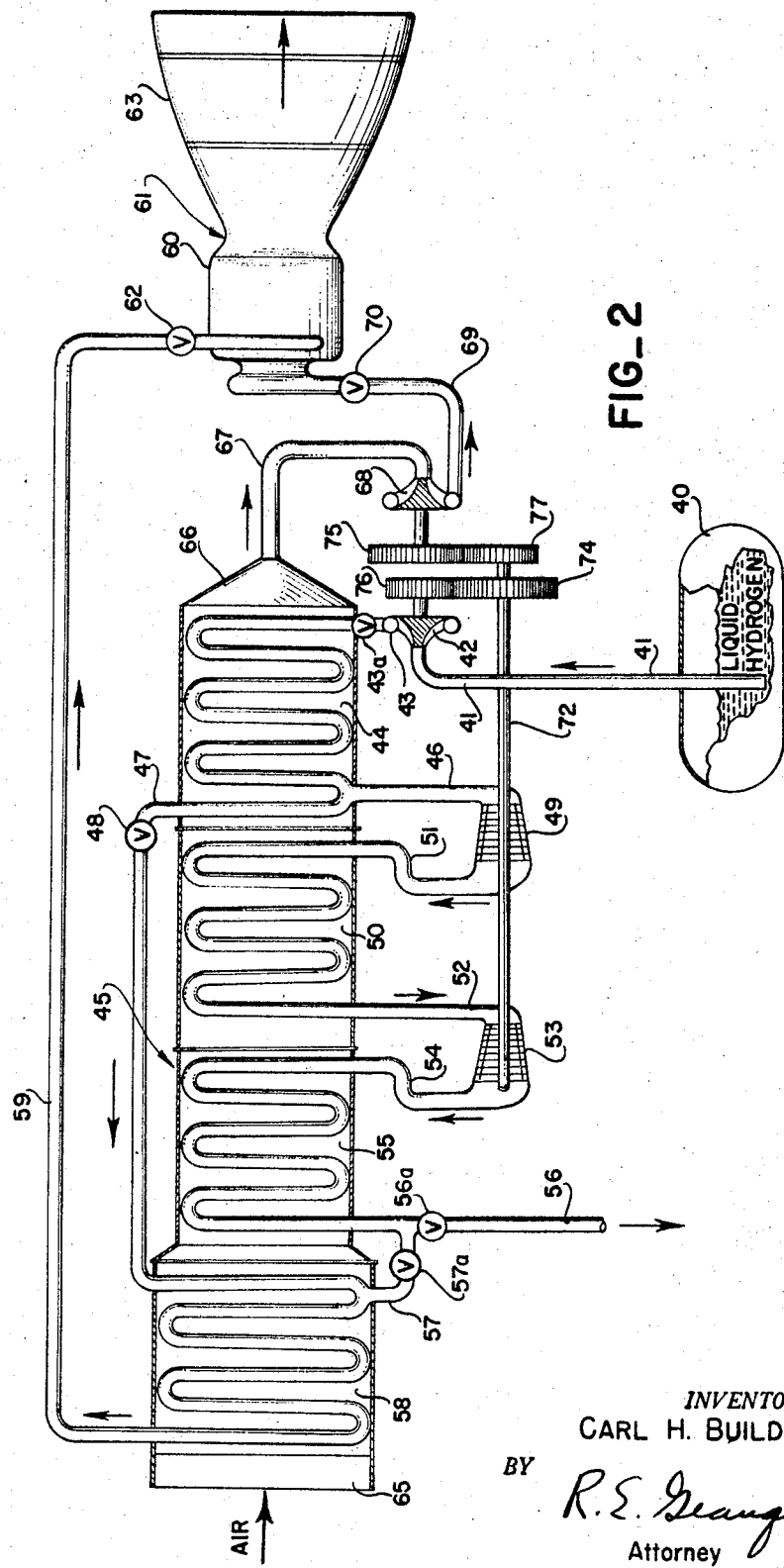

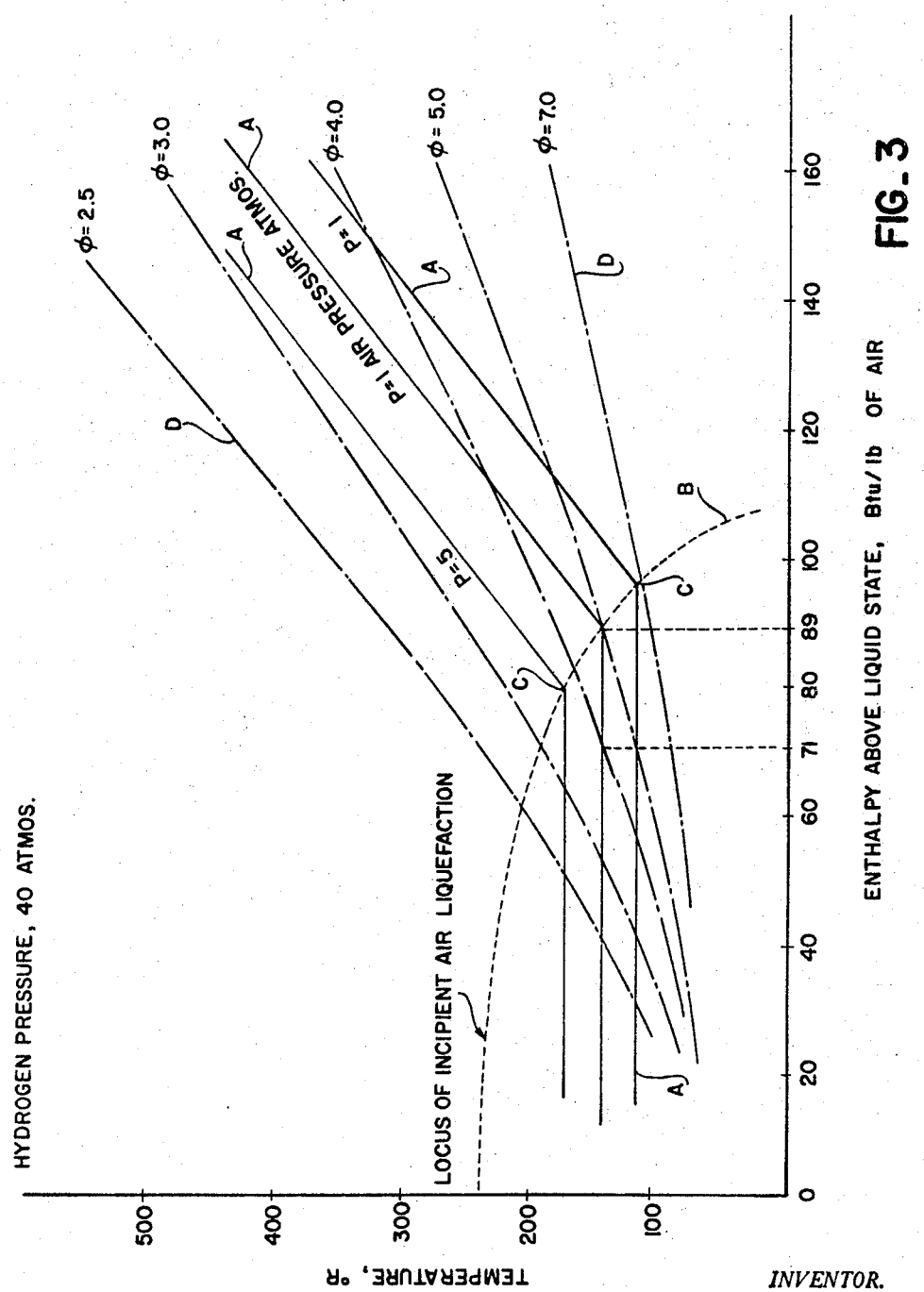
FIG_3

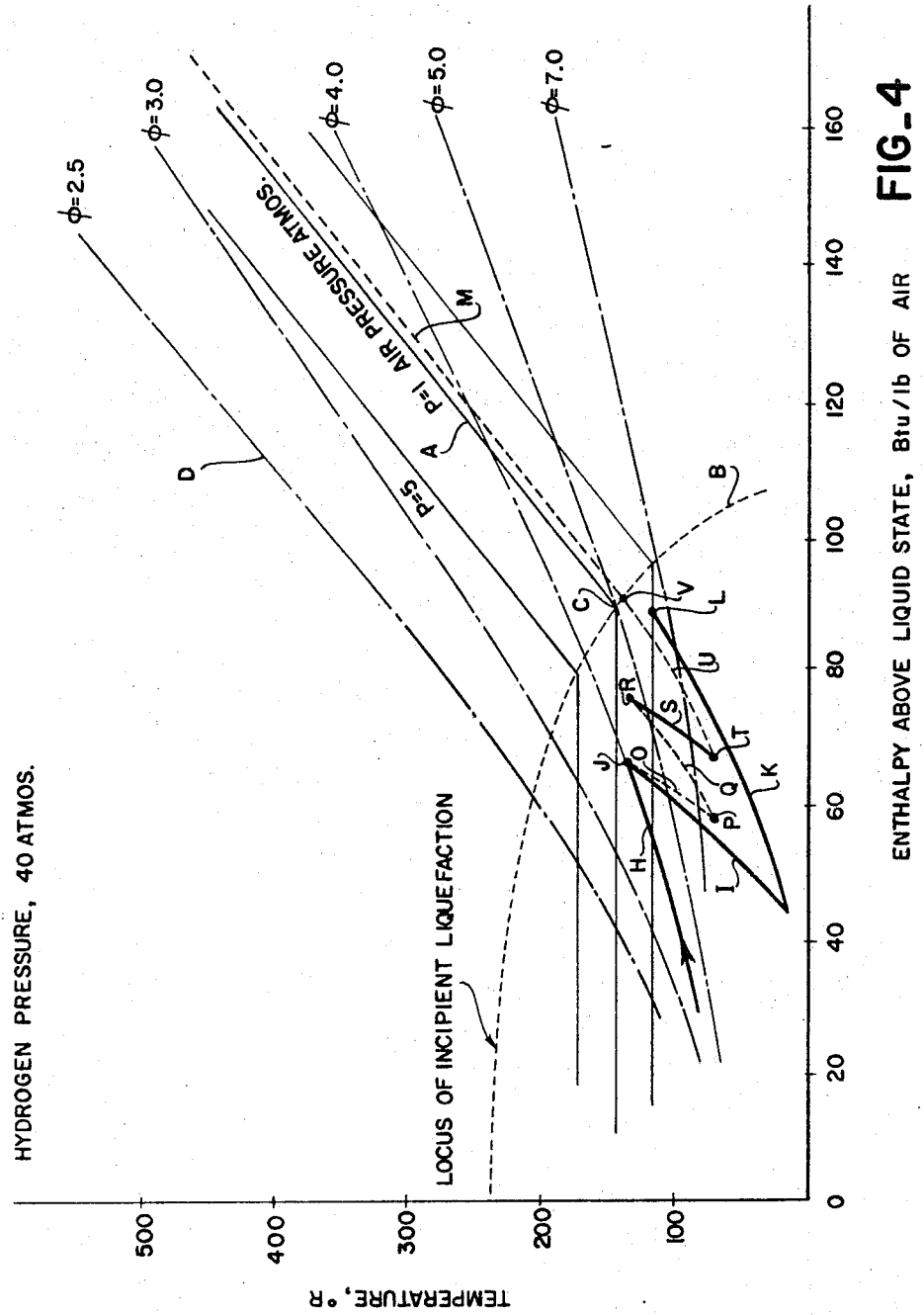

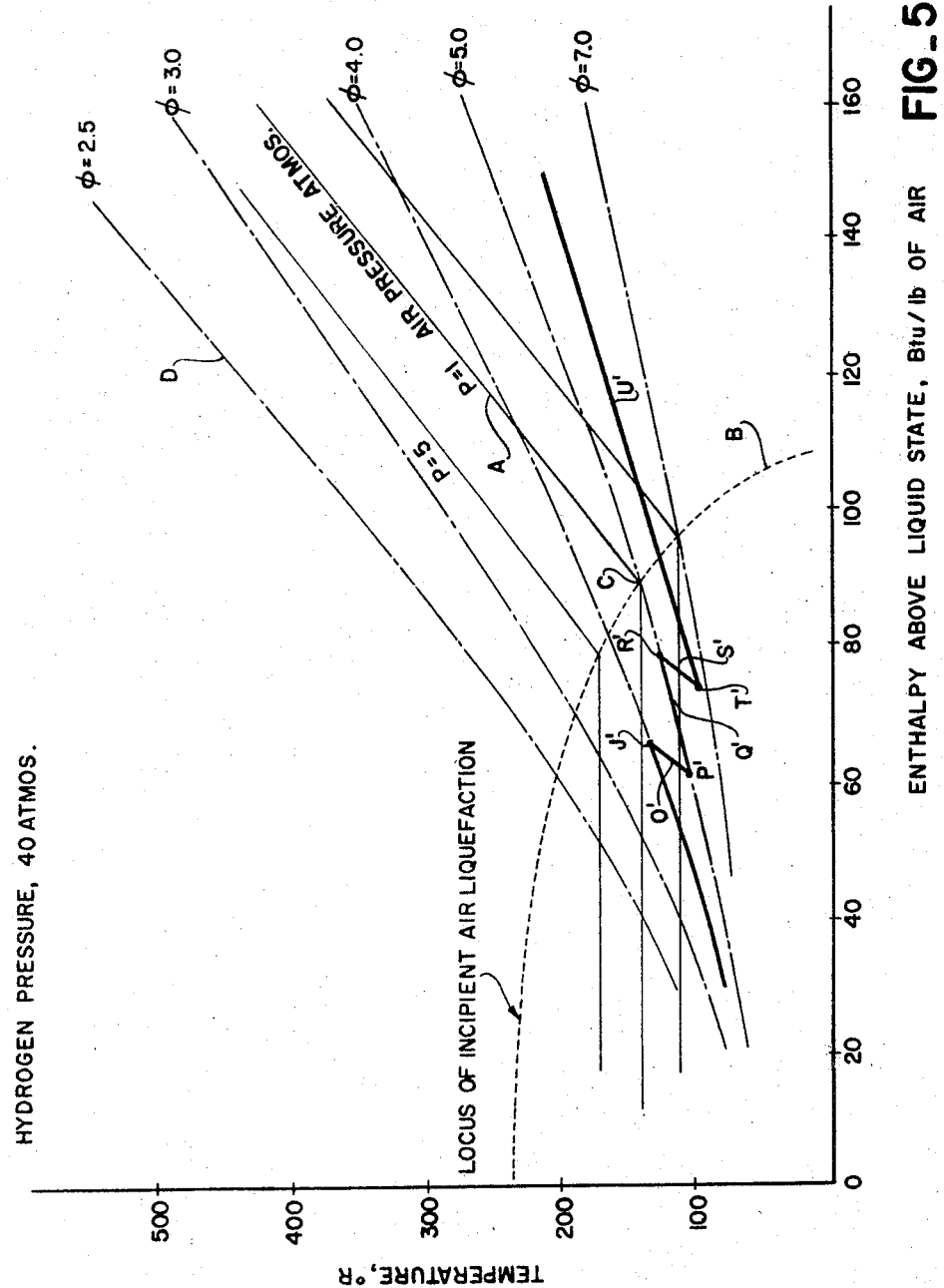

3,452,541
LIQUID AIR JET PROPULSION ENGINE AND
METHOD OF OPERATING SAME
Carl H. Builder, Sepulveda, Calif., assignor to The Marquardt Corporation, Van Nuys, Calif., a corporation of California
Filed Feb. 9, 1961, Ser. No. 88,163
Int. Cl. F02k 9/02
U.S. Cl. 60—39.46                              4 Claims This invention relates to a liquid air jet propulsion engine and method of operation of same, and more particularly to an engine in which the fuel, in a cryogenic state, is used for liquefying air before being burned with the fuel to produce jet propulsion thrust for propelling an aircraft or related vehicle.

It is well known to utilize the heat sink capacity of a cryogenic fuel to liquefy ambient air and then burn the fuel with the air in a suitable power plant. Such engine concepts heretofore, have consisted of a suitable heat exchanger wherein ambient air is cooled and liquefied by the cryogenic fuel. Following liquefaction, the air can be pressurized by a suitable pump with a very large reduction in required power as compared to compressing the air to the same pressure in the gaseous state. The pressurized liquefied air and the fuel leaving the heat exchanger are admitted to a suitable combustor and expansion means for effecting the desired output of the engine. In order to achieve complete air liquefaction in such engines, it has been found that the fuel/air ratio required in the heat exchanger is several times greater than that normally utilized in a conventional combustion chamber not concerned with air liquefaction. Thus, in effect, the heat exchanger and the combustion chamber are, on the basis of fuel/air ratio, mismatched. Under such conditions, a rather large excess of fuel is admitted to the combustion chamber and the net result is a relatively high specific fuel consumption for such an engine.

The present invention proposes a liquid air engine and operating cycle wherein the fuel/air ratio of the heat exchanger can be appreciably reduced and thereby achieve a greater compatibility between these two major components of the propulsion plant. The net result is an engine having a specific fuel consumption appreciably lower than prior engines of this type. While liquid hydrogen is the preferred fuel, it is understood that the invention is not limited or restricted solely to the use of this fuel.

The reduction in specific fuel consumption is accomplished by expanding and cooling at least a part of the fuel before the fuel is utilized in heat exchange relationship with air at the stage of incipient liquefaction. Since the fuel introduced to the heat exchanger is above its critical pressure, it would not pass through a two-phase region during its expansion through the heat exchanger device. However, since the incoming air is at substantially atmospheric pressure and below its critical pressure, it does pass through a nearly isothermal two-phase region at some stage in the heat exchanger commencing with incipient liquefaction. The effect of this isothermal region for air causes a "pinching" of the temperature difference between the two fluids at the point of incipient liquefaction of the air.

The withdrawing of at least a portion of the hydrogen at a point ahead of incipent liquefaction of the air and expanding this hydrogen permits the hydrogen to be returned to the heat exchanger at a temperature substantially below the air temperature at incipient liquefaction. Thus, the fuel/air ratio can be substantially less than would be required if sufficient fuel were utilized to liquefy the air and maintain the proper temperature differential at the "pinch" point in the normal heat exchange relationship and without expansion of hydrogen.

It is therefore an object of the present invention to provide a liquid air jet propulsion engine and method of operation utilizing a cryogenic fuel to liquefy air with which the fuel is combusted to produce propulsion thrust; said engine and cycle utilizing the expansion of at least a portion of the fuel to produce cooling thereof prior to the fuel encountering the air in condition of incipient liquefaction so that the expanded fuel can be returned into heat exchange relationship with this air to maintain the proper temperature differential during the liquefaction process.

Another object of the present invention is to provide a liquid air jet propulsion engine and method of operating same in which a cryogenic fuel is passed in heat exchange relationship with atmospheric air to produce an oxidant for the fuel; a portion of the fuel being withdrawn and expanded to cool same and thereafter being discharged to the atmosphere through a heat exchanger portion where liquefaction of the air is accomplished.

Another object of the invention is to provide an apparatus and method for liquefying air with a cryogenic fuel, comprising heat exchanger means having one or more sections from which the fuel is withdrawn, expanded and returned, the returned fuel remaining at a temperature below the air temperature when passed in heat exchange relationship with the air during liquefaction.

A further object of the invention is to provide an engine and cycle of operation therefor in which cryogenic fuel is utilized to produce liquid air as an oxidant; at least a portion of said fuel being expanded and cooled to a temperature which is substantially lower than the temperature of air at incipient liquefaction, so that this fuel can be utilized in heat exchange relationship with the air to liquefy same.

Another object of the invention is to provide an engine and cycle of operation therefor in which cryogenic fuel is utilized to produce liquid air as an oxidant, at least a portion of the fuel being expanded during the liquefaction process to reduce its temperature for use in heat exchange relationship with the air at its point of incipient liquefaction thereby reducing the specific fuel consumption substantially below that possible without such expansion.

These and other objects of the invention not specifically set forth above will become readily apparent from the description and drawings in which:

FIGURE 1 is a diagrammatic view of a first form of the invention in which a portion of fuel is expanded and thereafter discharged from the heat exchanger after being utilized in the liquefaction process.

FIGURE 2 is a diagrammatic view of a second form of the invention in which fuel is withdrawn and expanded in more than one stage and thereafter optionally discharged from the heat exchanger.

FIGURE 3 is a graphic plot of absolute temperature versus enthalpy for the two fluids passing through the heat exchanger of the engine of the present invention.

FIGURE 4 is a graphic illustration similar to FIGURE 3 showing typical examples of the operation of the engines of FIGURES 1 and 2.

FIGURE 5 is a graphic illustration similar to FIGURE 3 showing a typical example of the operation of the engine of FIGURE 2 wherein all the hydrogen is expanded through both the turbines.

Referring to the form of the invention illustrated in FIGURE 1, a fuel supply tank 1 containing liquid hydrogen, is connected by passage 2 to a liquid hydrogen pump 3. Passage 4 containing valve 5 connects the outlet of pump 3 with the entrance end of secondary condenser 6 of the heat exchanger unit 7. The discharge end of the secondary condenser 6 connects with a pair of passages 8 and 9. Passage 8 leads a portion of the hydrogen discharged from the secondary condenser 6 to the turbine 10 through which it is expanded, in order to cool this portion of the hydrogen. It is understood that the pump 3 raises the pressure of the hydrogen in passage 4 entering the secondary condenser 6 to a high pressure above the critical pressure and that considerable cooling of the hydrogen will thus take place in expansion through the turbine 10. The power output of turbine 10 is transmitted through the shaft 11, gears 12 and 13, and shaft 14 to the pump 3.

The very cold gaseous hydrogen vapor, exhausted from the turbine, is lead through passage 15 to the primary condenser section 16 of heat exchanger unit 7. After passing through the primary condenser 16, the hydrogen gas is discharged to any suitable low pressure source through passage 17 and thus hydrogen can be utilized as fuel for other secondary power producing units. The portion of the hydrogen, discharged from the secondary condenser 6, which will enter passages 8 and 9 is controlled by valve 20 in the passage 9. The portion entering passage 9 bypasses the primary condenser 16 and connects with the pre-cooler section 21. Passage 22 connects the hydrogen discharge from the pre-cooler 21 through a valve 23 to the combustion chamber 24 of the propulsion means 25. The product of combustion of the hydrogen is discharged through nozzle 26 of the propulsion means to produce thrust.

The ambient air, which is to be liquefied, enters heat exchanger unit 7 at entrance 29 and passes through the pre-cooler 21. Thereafter, the air passes in succession through the primary condenser 16 and through the secondary condenser 6 and arrives in liquid form at collector 30 located at the end of the heat exchanger unit 7. All the liquefied air is connected by passage 31 to liquid air pump 32 which is also driven by shaft 11 through gears 33 and 34 and shaft 35. High pressure liquid air is discharged from the pump 32 to passage 36 which connects with the combustion chamber 24 of the propulsion unit 25 through a valve 37.

In operation of the engine of FIGURE 1, the high pressure hydrogen in passage 3 enters the secondary condenser 6 in substantially liquid form, and upon leaving the secondary condenser 6, it will be in substantially vapor form. The portion of the hydrogen vapor which by-passes through passage 9 to the pre-cooler 21 will remain at substantially the temperature of discharge from the secondary condenser 6. This by-passed portion of hydrogen vapor is solely utilized in the pre-cooler 21 to bring the entering air temperature down to about the point of incipient liquefaction. Since air at one atmosphere of pressure begins to liquefy at a temperature of 144° R, the air discharged from the pre-cooler 21 will be at about this temperature when the engine 25 is operating at low attitudes.

In order to ensure that proper heat exchange temperature differential exists between the hydrogen and air throughout the heat exchanger unit 7, a portion of the hydrogen is passed through the turbine 10 and cooled by expansion to a temperature substantially below the liquefaction temperature of air. In other words, if the hydrogen is raised to a high pressure, for example 40 atmosphere, substantial cooling of the portion of the hydrogen in passage 8 will take place during its expansion to ambient pressure through turbine 10. Since the air entering the primary condenser 16 is near its saturation point, and is further cooled by the lower temperature expanded hydrogen, a portion of the air will be liquefied in the primary condenser 16 while complete liquefaction of the air occurs in the secondary condenser 6 and is collected in passage 31. The cooling of a portion of the hydrogen fuel by expansion through turbine 10 ensures that at all points in the heat exchanger 7, the hydrogen temperature will be below that of the air, and that proper heat transfer will continue throughout the heat exchanger unit. When the quantity of hydrogen gas in passage 22 and the quantity of liquid air in passage 36 have reached a sufficient amount, the valves 23 and 37, respectively, can be regulated to dischorge these substances into the combustion chamber 24. Any suitable ignition means can be utilized in the combustion chamber to ignite the hydrogen with the air to produce combustion gases which are expanded through the nozzle 26 to produce the propulsive thrust.

Referring to the second form of the invention illustrated in FIGURE 2, the liquid hydrogen fuel is contained in fuel supply tank 40 which is connected by passage 41 to the hydrogen pump 42. Passage 43 connects the output of the pump 42 with the entrance end of secondary condenser section 44 of the heat exchanger unit 45 through a valve 43a. The discharge end of secondary condenser 44 connects to passage 46 and to passage 47 containing a valve 48. The setting of valve 48 regulates the hydrogen flow rate which enters each of these passages 46 and 47. The hydrogen fuel in passage 46 is expanded through a turbine 49, and the resulting low temperature hydrogen gas exhausted from the turbine is connected to the entrance end of section 50 of a primary condenser section of the heat exchanger through the passage 51. The section 50 discharges the hydrogen through passage 52 to a second expansion turbine 53 and the low temperature hydrogen discharged from this turbine is connected by passage 54 to the forward section 55 of the primary condenser. The hydrogen discharged from the section 55 is divided between exhaust passage 56 and passage 57 leading to the pre-cooler 58. The valves 56a and 57a in the passages 56 and 57, respectively, are used to control the division of hydrogen flow through each of the respective passages. With valve 57a closed, the hydrogen from passage 47 continues through the pre-cooler 58, and is discharged through passage 59 to the combustion chamber 60 of the propulsion unit 61. The passage 59 contains the regulating fuel valve 62 and the combustion products from the chamber are discharged through nozzle 63 to produce thrust.

Ambient air enters the heat exchanger unit 45 through the entrance 65 and first passes through the pre-cooler 58. At the end of the pre-cooler, the air is approximately at the point of incipient liquefaction. Thereafter, the air, in passing through the primary condenser sections 55 and 50 is partially liquefied. Final liquefaction takes place in the secondary condenser 44. The liquid air collector 66 is located at the aft end of the heat exchanger unit 45 and is connected by a passage 67 to liquid air pump 68. High pressure liquid air is discharged from the pump through the passage 69 and valve 70 to the combustion chamber 60 of the propulsion unit 61. The turbines 53 and 49 are connected to a common output shaft 72 which drives pump 42 through gears 74 and 76 and pump 68 through gears 77 and 75.

During operation of the form of the invention of FIGURE 2, liquid hydrogen is supplied to the secondary condenser 44 at a pressure above its critical pressure, for example and preferably in the range of 40 atmospheres, and by liquefying the final portion of the air in condenser 44, the hydrogen temperature is increased such that it is in vapor form at the time it is discharged to passages 46 and 47. After expanding through the turbine 49, the hydrogen enters the section 50 of the primary condenser at a substantially lower temperature, and in passing through section 50, the hydrogen serves to liquefy a portion of the air. The warmed hydrogen discharged from section 50 of the primary condenser is then expanded through the turbine 53 and the cold hydrogen exhausted from the turbine 53 enters the primary condenser section 55. When the hydrogen is discharged from the condenser section 55, its temperature is below the saturation temperature of the air leaving the pre-cooler 58. The total pressure drop available to turbines 49 and 53 can be so divided between each of the turbines such that the temperature of the hydrogen throughout condenser 50 and 55 will at all times be sufficiently lower than the air temperature to achieve adequate cooling and air liquefaction.

When the valve 56a is open and the valve 57a is closed, all the hydrogen leaving condenser section 55 will be transferred to a suitable low pressure environment. Under such conditions, the by-pass valve 48 can be adjusted to pass a portion of the total hydrogen flow through the sections 50 and 55 and the turbines 49 and 53. However, under certain modes of operation, it may be desirable to pass all of the hydrogen fuel through the turbines 49 and 53. In this case, the by-pass valve 48 is closed and the valves 56a and 57a are adjusted to permit the hydrogen flow to be divided into passages 56 and 57 or, with valve 56a closed, to pass all of the hydrogen on to the pre-cooler 58. Thus, the valving arrangement of FIGURE 2 provides the alternative of expanding a portion of the hydrogen fuel through the turbines while by-passing another portion to the pre-cooler 58, or of passing all of the hydrogen fuel through the turbines and then passing either a portion or all of the exhaust onto the pre-cooler 58. This latter valve setting would provide maximum cooling of the air in condensers 50 and 55 by expanding all of the hydrogen through the turbines 49 and 53, whereas the first valve setting provides sufficient cooling of the air when the cooling load is less than maximum. Valves 48 and 57a cannot be closed at the same time since pre-cooler 58 would then be inoperative.

Referring to the enthalpy versus temperature plot of FIGURE 3, lines A comprise a pseudo-phase diaphragm for air at various pressures and line B represents the locus of incipient air liquefaction. The portions of line A above line B represent the superheated vapor condition of the air. The portions of the lines A to the left of line B, represent the liquid-vapor region with its nearly isothermal pressure lines. The intersection points C of the line A with the line B designate the temperature and enthalpy of incipient air liquefaction for each designated air pressure. Superimposed on the chart are dashed lines D, which represent various amounts of hydrogen corresponding to various hydrogen-to-air equivalence ratios $\phi$ ranging from 2.5 to 7.0, where such a ratio is designated multiple of the stoichiometric combustion ratio for hydrogen and air. Since this latter ratio is 0.0292 lb. per lb., a value of an equivalence ratio of five would correspond to 14.6 lbs. of hydrogen per hundred pounds of air. It is pointed out that the hydrogen equivalence ratio $\phi$ lines of FIGURE 3 are based on hydrogen at a pressure of 40 atmospheres and assumes hydrogen at equilibrium between its ortho and para forms.

In both of the heat exchangers of FIGURES 1 and 2, the temperature gradient between the hydrogen and the air must at all points in the heat exchanger, favor the absorption of heat by the hydrogen from the air. This is best accomplished by heat exchangers of the counter-flow type. Thus, in FIGURE 3, an account of the prevailing conditions of the hydrogen moving through the heat exchangers is a path moving from left to upper right along the equivalence ratio lines D. In the opposite direction, the air flow conditions would be indicated by a path moving from right to lower left along the constant air pressure lines A. Since the hydrogen is pumped to a pressure above its critical pressure, it will undergo no change of state as it moves through the heat exchanger along a trace from left to right on the equivalence ratio lines D. The air, however, at any pressure, will experience a change of state at a point C defined by the intersection of the particular pressure line with the liquefaction line B. As further heat is removed from the air, the cooling process is one which is very nearly isothermal and is a two-phase region where more and more of the air vapor is converted to liquid air. The result of the nearly isothermal lines of air liquefaction is to cause a "pinching" effect of the temperature difference between the two fluids at the point of incipient air liquefaction. This point is, therefore, the critical operating point for any heat exchanger in which a change of state occurs in one of the fluids. It is, therefore, essential that the amount of hydrogen flowing through the heat exchanger, must at all times, be sufficient to maintain the hydrogen temperature below the air temperature at the point of incipient liquefaction for air, namely, point C for each air pressure line. Referring to FIGURE 3, it can be seen that for air at one atmosphere of pressure, the equivalence ratio for hydrogen must exceed 5 for the temperature gradient to be favorable at the pinch point C, if no expansion and cooling intermediate of the heat exchanger section were employed such as has been described in connection with the forms of the invention of FIGURES 1 and 2. If it is specified that the temperature difference at the pinch point be of any substantial value, then a fuel/air equivalence ratio of 6 or more would be required.

Obviously, it is desired to reduce the equivalence ratio for the engine operation to result in the lowest specific fuel consumption as possible. If the equivalence ratio were reduced to 4 (as an example), it is obvious from the curves of FIGURE 3, that the air temperature at the point C of incipient liquefaction at one atmosphere would be lower than the hydrogen temperature and the heat exchanger would become inoperative. A temperature differential in the right direction would only exist below 147° R. and above 234° R. for an equivalence of 4. Between these two temperatures, the hydrogen temperature would be above the air temperature, and the desired heat exchange would not occur. Since the temperature gradient remains favorable up to 147° R. and 71 B.t.u. per pound of air, and since incipient liquefaction at one atmosphere occurs at 89 B.t.u. per pound of air, it would be possible to get past the pinch point C with an equivalence ratio of 4 if 18 B.t.u. per pound of air could be removed at this point by the hydrogen. In the event a minimum temperature difference between the hydrogen and air was set at 20 degrees R., then it would be possible to get past the pinch point C with an equivalence ratio of 4 if 29 B.t.u. per pound of air could be removed by the hydrogen at this point.

Referring to FIGURES 1 and 2, the expansion turbine 10 of FIGURE 1 and the expansion turbines 49 and 53 of FIGURE 2 provide the means for removing the necessary enthalpy from the hydrogen which in effect is equivalent to moving to a higher equivalence ratio and thereby pass appreciably below point C to relieve the pinch effect.

Once the air is past the pinch point in the heat exchanger, the amount of hydrogen required for continued cooling of the air to complete liquefaction is comparatively small and is a constant. Comparison of the specific heats of air and of hydrogen show that an equivalence ratio of only about 2.5 is required at temperatures above the pinch point. Therefore, only in the condenser sections would fuel equivalence ratios in excess of about 2.5 be required to get past the pinch in the heat exchanger.

With the above explanation of the pinch point, typical operation conditions for the apparatus of FIGURES 1 and 2 can be illustrated by the curves of FIGURE 4. Liquid hydrogen introduced to the secondary condenser 6 of FIGURE 1 at an equivalence ratio of 4 will be heated along the line H to the point J which is slightly below the liquefaction temperature line of the air at one atmosphere pressure. Point J is also shown in FIGURE 1 where the passage 8 connects with the secondary condenser 6. The divided hydrogen is then expanded through turbine 10, the process being depicted on FIGURE 4 by line I. The hydrogen discharge from the turbine 10 is then reheated in condenser 16 along line K of FIGURE 4. The hydrogen at point L leaves the condenser 16 still at a temperature somewhat below the pinch point C, and is discharged through passage 17. It is therefore apparent that the temperature of the hydrogen in the primary condenser 16 is always below the incipient liquefaction temperature of the air, so that the hydrogen continues to cool the air through the pinch point. The portion of the hydrogen in by-pass line 9 enters the pre-cooler in essentially the same state as discharged from the secondary condenser 6, and has been decreased in mass so as to provide an equivalence ratio of about 2.5 as it enters the pre-cooler 21. Since the line H of FIGURE 4 is for an equivalence ratio of 4, it is possible to remove hydrogen mass flow and have the amount of hydrogen entering the pre-cooler 21 equal to that required for an equivalence ratio of 2.5, since a ratio of 2.5 is about as high as required in the pre-cooler for proper heat transfer. The removed hydrogen is the amount expanded through the turbine 10. Since the hydrogen in passage 9 has by-passed the primary condenser 16, its heating will be represented by the line M which has the same slope as the equivalence ratio line of 2.5, but which is shifted effectively to the right to commence at point V which is below pinch point C. This effective shift in enthalpy is due to the fact that the hydrogen in passage 9 was relieved of condenser cooling load at point J and has been by-passed directly to point N.

Thus, it is seen that the portion of the hydrogen removed in passage 8 and expanded through turbine 10 is always below the liquefaction temperature of the air in primary condenser 16. Furthermore, this portion of the hydrogen is the difference between the total hydrogen introduced to the heat exchanger and the hydrogen equivalent to about a 2.5 ratio which is introduced and by-passed by passage 9 to the pre-cooler. Since no air liquefaction occurs in the pre-cooler, and therefore no pinch effect, the by-passed hydrogen at an equivalence ratio of about 2.5 in the pre-cooler 21 is sufficient to maintain the temperature of the hydrogen below the entering air as it passes through the pre-cooler. It should be noted that even though the hydrogen in passage 17 is not used in the thrust chamber 25, the net effective thrust is only negligibly reduced, and depriving the thrust chamber of this hydrogen does not adversely affect the performance of the engine. On the other hand, the equivalence ratio can be substantially reduced from values of 7 or 8 (required for practical temperature differentials throughout the heat exchanger) to values approaching 4 or less through the use of the intermediate expansion of the hydrogen.

In the cycle just described, if 100 pounds per second of air enters the inlet 29, an equivalence ratio of 4 would require 11.6 pounds of hydrogen per second entering the secondary condenser 6. Of this hydrogen, 4.5 pounds per second would pass through the turbine 10 and would be discharged through passage 17. Also, 7.1 pounds per second of hydrogen would be by-passed through passage 9 to the pre-cooler 21 to provide an equivalence ratio in the pre-cooler of 2.5. This latter equivalence ratio exists in the combustion chamber 24. It should be understood that these figures represent only one typical condition of operation and that the equivalence ratio of the entering hydrogen as well as the ratio of hydrogen expanded to that by-passed to the pre-cooler can be altered.

Referring to the operation of the form of the invention of FIGURE 2, when the valve 60 is closed, and the valve 59 is open, the valve 48 can be adjusted to cause a portion of the entering hydrogen to flow through condenser sections 50 and 55 and be discharged through passage 56, while the remaining portion will enter the pre-cooler 58 through passage 47. Under these conditions, the operation of FIGURE 2 is similar to that of FIGURE 1, except that the hydrogen is expanded through two separate stages instead of through a single stage. It should be understood that any number of stages can be utilized as required by the particular operating condition. Referring to FIGURE 4, the point J again represents the point on the equivalence ratio line 4 at which the hydrogen is withdrawn at the discharge end of the secondary condenser 44. Expansion of the hydrogen takes place along line O in turbine 49 to the low temperature point P and is increased in temperature along the line Q through the primary condenser section 50. At point R, the hydrogen is discharged from the section 50 and expanded along line S through turbine 53 to the point T. The hydrogen then warms up along the line U to the point V at which the temperature is below the pinch point C. The hydrogen is discharged from the second section 55 at this temperature through the passage 56. As in the case of the first embodiment, the amount of hydrogen which is by-passed by the passage 47 can be sufficient to produce an equivalent ratio of about 2.5 in the pre-cooler 58. Under such conditions, the line M will also represent the cooling effect through the pre-cooler 58 in this example of operation of the second form of the invention.

A second mode of operation of FIGURE 2 results when the valve 48 is closed and the valves 56a and/or 57a are open to cause all of the hydrogen to pass through both of the turbines 49 and 53. The setting of the valves 57a and 56a will then determine what portion of the total hydrogen will go through pre-cooler 58 and what portion will be discharged through passage 56. Referring to FIGURE 5, all of the hydrogen will leave the secondary condenser 44 at point J′, and will expand through the turbine 49 along the line O′ to the point P′. All of the hydrogen will be heated in condenser 50 along the line Q′ to the point R′ at which point it will be removed from condenser 50 and introduced to the expansion unit 53. Expansion of all hydrogen will take place along the line S′ to the point T′. When valve 56a is closed and valve 57a opened, such that all the hydrogen leaving condenser 55 passes to pre-cooler 58, the hydrogen will warm up along the line U′. It is understood that the valves 56a and 57a can be adjusted to permit discharge of portions of the hydrogen through passages 56 and 57 and still maintain the hydrogen flow to the pre-cooler 58 at an equivalence ratio of 2.5

By the present invention there is provided an engine and method of operation in which the equivalence ratio of fuel to air can be substantially reduced over prior known methods of operation, and thereby reduce the specific fuel consumption of the engine. The specific fuel consumption will be appreciably less than would be required if the hydrogen were simply passed in straight heat transfer relationship with the incoming air. This reduction in specific fuel consumption is achieved by the selective expansion of a portion or of all the hydrogen at a time or under conditions in which the expansion will lower the hydrogen temperature below that of the air at the pinch point in the heat exchanger. It is understood that the operating conditions of the engine can be adapted to the power output and ambient conditions of operation in order to maintain a minimum equivalence ratio for the power output required. Various modifications are contemplated by those skilled in the art without departing from the spirit and scope of the invention as hereinafter defined by the appended claims.

What is claimed is:

1. A heat exchange apparatus for an engine which utilizes a source of liquid hydrogen as a fuel and as a coolant for producing liquid air used as an oxidant comprising, a pre-cooling section, a primary condenser section and a secondary condenser section having air passages connected in series, means for introducing hydrogen to the secondary condenser section, means for expanding a portion of the hydrogen leaving the secondary condenser section to cool said portion substantially below the pinch point for the air occurring at substantially incipient liquefaction, means for connecting the expanded hydrogen portion to said primary condenser section for taking the air through its pinch point, means for bypassing hydrogen from the secondary condenser section to the pre-cooler section, means for connecting the hydrogen discharge of the primary condenser section to exhaust and to the pre-cooler section, and valve means for regulating hydrogen flow through said by-passing means and said connecting means.

2. An engine utilizing a source of liquid hydrogen as fuel and as a coolant for producing liquid air used as an oxidant comprising heat exchange means having a pre-cooler, a primary condenser, and a secondary condenser having air passages connected in series, means for introducing hydrogen to the secondary condenser, means for expanding a portion of the hydrogen leaving the secondary condenser to cool said portion substantially below the pinch point for air substantially at the condition of incipient liquefaction, means for connecting the expanded hydrogen to said primary condenser for cooling the air through its pinch point, means for bypassing hydrogen from the secondary condenser to the pre-cooler, means for connecting the hydrogen discharged from the primary condenser to exhaust and to the pre-cooler, valve means for regulating the quantities of expanded hydrogen connected to the pre-cooler and exhausted and the quantity of hydrogen bypassed, means for connecting the hydrogen discharged from the pre-cooler to the engine, and means for connecting the liquid air produced by said heat exchange means to the engine for combustion with the hydrogen.

3. A heat exchanger for an engine which utilizes a supply of liquid hydrogen as fuel and as a coolant for producing liquid air used as an oxidant comprising:
- a secondary condenser section for said heat exchanger connected with the supply of liquid hydrogen for final liquefaction of the air discharged into said secondary condenser section;
- first and second hydrogen passages connected with the discharge of said secondary condenser section;
- expansion means connected with said first passage for expanding a portion of the hydrogen to a lower temperature;
- a primary condenser section for said heat exchanger re-receiving air at just above its temperature of incipient liquefaction and discharging the air to said secondary section;
- means for connecting the expanded hydrogen to said primary condenser section for liquefying a portion of the air discharged to said secondary section;
- means connected to the discharge end of said primary condenser section for exhausting hydrogen;
- a precooler section for said heat exchanger receiving incoming air and discharging the air to said primary condenser section;
- means for connecting said precooler section with said second passage;
- means for connecting the hydrogen discharged from said precooler section to said engine;
- means for connecting the liquid air discharged from said secondary condenser with said engine; and
- means for regulating the portion of hydrogen by-passing the primary condenser section and the portion expanding through said expansion means.

4. A heat exchanger for an engine which utilizes a supply of liquid hydrogen as fuel and as a coolant for producing liquid air used as an oxidant comprising:
- a secondary condenser section for said heat exchanger connected with the supply of liquid hydrogen for final liquefaction of the air discharged into said secondary condenser section;
- first and second hydrogen passages connected with the discharge of said secondary condenser section;
- expansion means connected with said first passage for expanding a portion of the hydrogen to a lower temperature;
- a primary condenser section for said heat exchanger re-receiving air at just above its temperature of incipient liquefaction and discharging the air to said secondary section;
- means for connecting the expanded hydrogen to said primary condenser section for liquefying a portion of the air discharged to said secondary section;
- means connected to the discharge end of said primary condenser section for exhausting hydrogen;
- a precooler section for said heat exchanger receiving incoming air and discharging the air to said primary condenser section;
- means for connecting said precooler section with said second passage;
- means for connecting the hydrogen discharged from said precooler section to said engine; and
- means for connecting the liquid air discharged from said secondary condenser with said engine;
- said hydrogen exhausting means comprising a third passage for connecting the discharge end of said primary condenser section to exhaust, a fourth passage for connecting the discharge end of said primary condenser section to the precooler section, and regulating means for controlling the flow through said third and fourth passages.

References Cited

UNITED STATES PATENTS

| | | | |
|---|---|---|---|
| 2,960,834 | 11/1960 | Kirkpatrick | 62—38 X |
| 3,002,340 | 10/1961 | Landerman | 60—35.6 |

ROBERT F. STAHL, *Primary Examiner.*

U.S. Cl. X.R.

60—257; 62—38